United States Patent [19]

Stemmler et al.

[11] Patent Number: 5,625,542
[45] Date of Patent: Apr. 29, 1997

[54] LOW-NOISE OPERATION OF A MACHINE FED BY A PULSE INVERTER

[75] Inventors: Herbert Stemmler, Kirchdorf; Thomas Eilinger, Winterthur, both of Switzerland

[73] Assignee: Inventio AG, Hergiswil, Switzerland

[21] Appl. No.: 449,306

[22] Filed: May 24, 1995

[30] Foreign Application Priority Data

Jun. 3, 1994 [EP] European Pat. Off. ............. 94108512

[51] Int. Cl.$^6$ ........................................... H02M 1/12
[52] U.S. Cl. ........................... 363/41; 318/811; 388/811; 363/98; 363/132
[58] Field of Search ..................... 363/41, 56, 97, 363/98, 135, 132

[56] References Cited

U.S. PATENT DOCUMENTS

| | | | |
|---|---|---|---|
| 4,691,269 | 9/1987 | Yamane et al. | 363/41 |
| 5,068,777 | 11/1991 | Ito | 363/97 |

FOREIGN PATENT DOCUMENTS

| | | |
|---|---|---|
| 3912706 | 10/1990 | Germany. |
| 63-148894 | 6/1988 | Japan. |

OTHER PUBLICATIONS

Blaabjerg et al., *Improved Modulation Techniques for PWM-VSI Drives*, pp. 1187-1192, Nov. 15-1993, Maui, Hawaii, IEEE vol. 2, Power Electronics.

*Primary Examiner*—Peter S. Wong
*Assistant Examiner*—Shawn Riley
*Attorney, Agent, or Firm*—Howard & Howard Attorneys

[57] ABSTRACT

A method and apparatus for the low noise operation of a electrical machine driven by a pulse inverter computes the amplitudes and frequencies of the harmonics of the inverter output voltages. Through targeted setting of the modulation parameters, the frequency spectrum or the noise spectrum can be fanned out and harmonics, which would excite stator resonances, can be eliminated. Due to the independence of the modulation parameters from the modulation index ($a_0$) and the fundamental oscillation frequency ($f_1$), the fanning-out and the elimination has no influence on the fundamental oscillation ($u_{GS}$) or on the operating point of the machine. The inverter is controlled through sinusoidal pulse width modulation (PWM) and sinusoidal pulse frequency modulation (PFM) of a triangular carrier signal ($U_H$). By this method, the main groups of the harmonics with two ordinate numbers (n, v) are fanned out into subgroups with three ordinate numbers (n, m, v). In addition to a more uniform distribution, there also is a reduction in the amplitudes of the harmonics ($U_{nmv}$) through this fanning-out method. The generated noise is reduced in level and the sound pattern does not contain any conspicuous unpleasant individual frequencies.

13 Claims, 5 Drawing Sheets

| $u_a$ | $u_b$ | $u_c$ | $\vec{u}_x$ |
|---|---|---|---|
| − | − | − | $\vec{u}_0$ |
| + | − | − | $\vec{u}_1$ |
| + | + | − | $\vec{u}_2$ |
| − | + | − | $\vec{u}_3$ |
| − | + | + | $\vec{u}_4$ |
| − | − | + | $\vec{u}_5$ |
| + | − | + | $\vec{u}_6$ |
| + | + | + | $\vec{u}_7$ |

Fig. 8b

LOW-NOISE OPERATION OF A MACHINE FED BY A PULSE INVERTER

BACKGROUND OF THE INVENTION

The present invention relates generally to an apparatus for inverting electrical power and, in particular, to an inverter apparatus and method for the low-noise operation of an electrical machine.

Most of the electrical machines fed by a pulse inverter operate with switching frequencies which lie in the most sensitive range of human hearing (2 kilohertz to 10 kilohertz). A frequently used control principle is the subharmonic method at constant carrier frequency. The frequency spectrum produced by this method however displays individual harmonics with high amplitudes, which harmonics produce an unpleasant noise. The usually used triangular carrier signal for the determination of the switching instants of the inverter has a constant frequency.

A method for the low-noise operation of an electrical machine fed by a pulse inverter, the pulse width modulator (PWM) of which operates by the subharmonic method, is shown in the German patent document DE-OS 39 12 706. The frequency of the carrier signal for the production of the pulse width modulated control pulses for the inverter is not preset as a certain value which is constant in the stationary state, but is varied constantly within a preset frequency band and independently of the operational state of the machine. This frequency spectrum of the inverter output voltages then does not consist of individual spectral lines, but is distributed over the entire frequency band.

In the aforedescribed method, which operates with pulse width modulation (PWM), the pulse frequency is varied also. A generator supplies a statically determined control signal (for example, having a Gaussian distribution) for the carrier signal frequency. The mean value and the bandwidth are preset for this frequency. The generator is a random generator or a digital generator for the production of pseudorandom numbers. In this case, the frequency spectrum is influenced only in random manner in a certain range. Because of the random modulation principle, an exact determination of the frequency spectrum is not possible. Moreover, harmonics, which excite mechanical resonances in the stator, can be eliminated only in some conditions or can be reduced permanently so that they no longer exert any disturbing effect.

SUMMARY OF THE INVENTION

The present invention concerns an apparatus and method for the low-noise operation of an electrical machine connected to receive electrical power from a pulse inverter. The apparatus includes an inverter having an input for connection to a direct current power source and three switchable means each having an output for connection to an electrical machine, the switchable means being responsive to a plurality of switching pulses for generating output voltages at the outputs to power an electrical machine connected to the outputs; and a modulator having three inputs each associated with one of the switching means, a control signal source for generating a control signal and three outputs each connected to an associated one of the switching means, each modulator input for receiving a modulation signal from a modulation signal source, the modulator being responsive to the control signal for modulating the modulation signals by one of carrier modulation and space modulation for generating the switching pulses whereby frequency components which produce disturbing harmonic components in the output voltages are reduced.

The method includes the steps of: a. generating a plurality of switching pulses by one of carrier signal modulation and space modulation for controlling a pulse pattern of output voltages generated by an inverter connected to an electrical machine; and b. varying a pulse frequency (F) of the carrier signal modulation and an inverse cycle period of a rotary vector sequence (F) of the space modulation whereby frequency components which produce disturbing harmonics in the output voltages are reduced.

The present invention has the object of proposing a method for the low-noise operation of an electrical machine of the initially mentioned kind and fed by a pulse inverter, which method does not display the disadvantages of prior known methods and leads to a noise characteristic which is more pleasant for the human ear and also is a reduction in the perceived loudness.

An advantage achieved by the present invention is that a targeted action on the pulse pattern with predictable result is possible. Due to the modulation of the carrier signal with a defined function, the amplitudes and frequencies of the harmonics of the inverter output voltages are exactly calculable. This means that the spectrum of the inverter output voltages is known at any instant. The harmonic frequencies can be distributed equally by targeted setting of parameters. Thereby, the harmonic amplitudes become smaller. Consequently, due to the smaller harmonic amplitudes and a uniform distribution of the harmonics over the frequency spectrum, a noise results, which is perceived to be less disturbing and the level of which is lower than for conventional methods.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIGS. 2a through 2d are plots of amplitude versus time for various signals generated by the inverter shown in the FIG. 1;

DESCRIPTION OF THE PREFERRED EMBODIMENT

Figure 1:
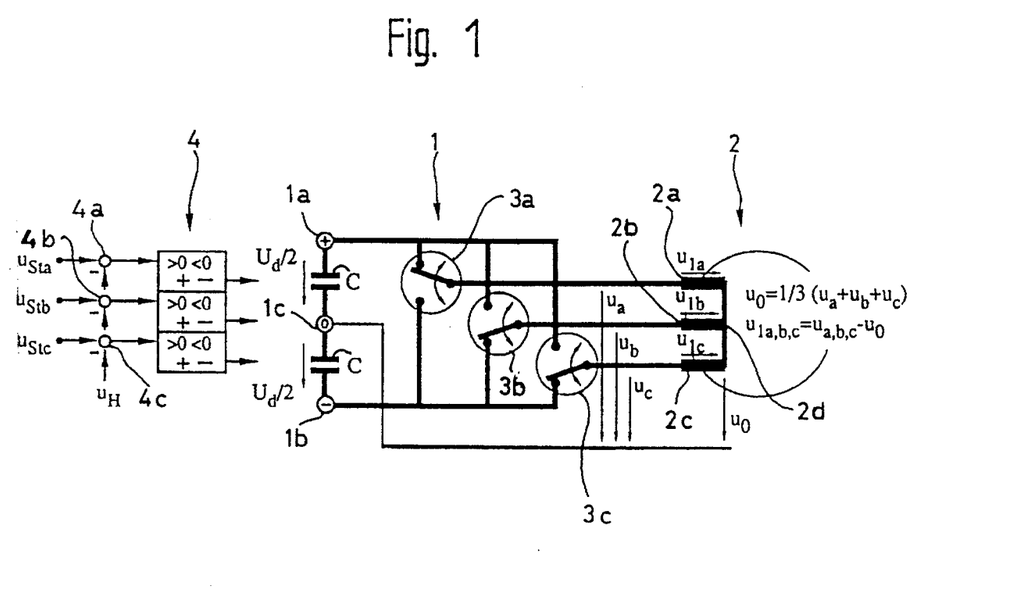
FIG. 1 is a schematic view of an electrical power inverter in accordance with the present invention.

There is shown in the FIG. 1 a schematic illustration of a three-phase pulse inverter 1 connected to and feeding alternating current electrical power to an electrical machine 2. The inverter 1 includes a pair of input terminals for connection to a source of direct current electrical power (not shown) at a voltage $U_d$, an input terminal 1a for connection to the positive polarity terminal of the power source and an input terminal 1b for connection to the negative polarity terminal of the power source. A pair of capacitors C are connected between respective ones of the input terminals and a neutral or ground terminal 1c such that one half of the power source voltage ($U_d/2$) is dropped across each capacitor. The inverter 1 also includes three switchable elements 3a, 3b and 3c each having one input contact connected to the terminal 1a and another input contact connected to the terminal 1b. Each of the switchable elements also has an output contact which is switched between the two input contacts in response to a switching control signal. The output contacts of the switchable elements 3a, 3b and 3c are connected to input terminals 2a, 2b and 2c respectively of stator windings of the electrical machine 2.

A modulator 4 generates the switching control pulses for controlling the switching elements 3a, 3b and 3c by comparing modulation signals $u_{Sta}$, $u_{Stb}$ and $u_{Stc}$ respectively with a carrier signal $u_H$. Although the sources of the modulation and carrier signals are not shown, these signals can be outputs from a standard wave generator. The modulation signals $u_{Sta}$, $u_{Stb}$, and $u_{Stc}$ are negative inputs to summing points 4a, 4b and 4c respectively while the carrier signal $u_H$ is a positive input to each of the summing points. In each case, when the output of a summing point is greater than zero (>0), a positive switch control pulse (+) is generated by the modulator 4 and when the output of a summing point is less than zero (<0), a negative switch control pulse (−) is generated by the modulator. The inverter 1 generates output voltages $u_a$, $u_b$ and $u_c$, as measured from the terminal 1c, at the output contacts of the switchable elements 3a, 3b and 3c respectively. As a consequence, the electrical machine 2 is provided with stator voltages $u_{1a}$, $U_{1b}$ and $u_{1c}$ at the input terminals 2a, 2b and 2c respectively as measured with respect to a zero star point 2d of the machine windings which is at a star zero point voltage $u_0$ as measured from the terminal 1c. The inverter output voltages $u_a$, $u_b$ and $u_c$ are each generated from that half of the input direct current voltage ($U_d/2$) which is switched through to the output of the inverter 1 by either a positive or a negative output of the corresponding summing point.

Figure 2A:
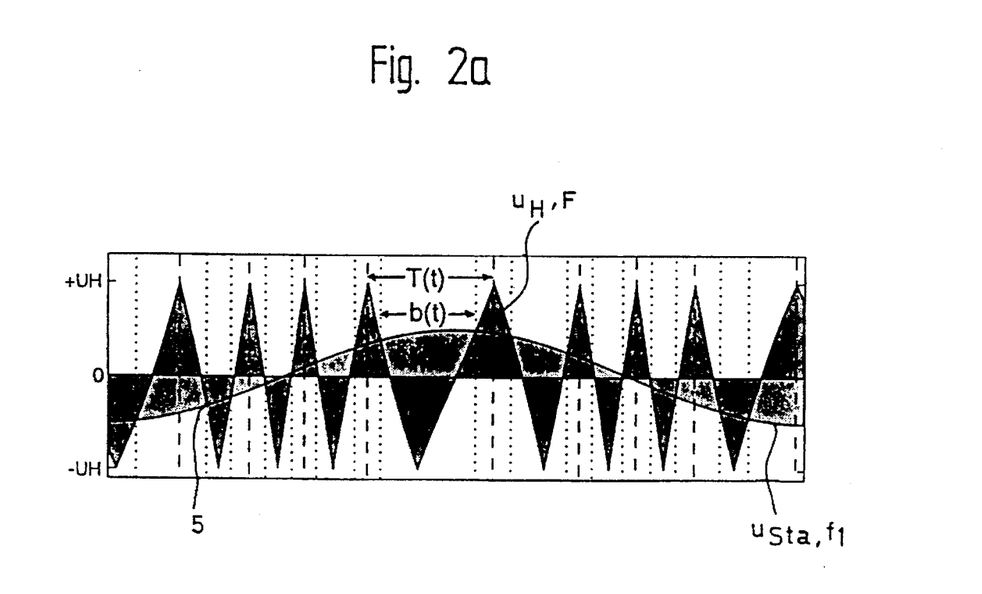

The FIG. 2a shows a plot of the voltage amplitude versus time for the modulation signal $u_{STa}$ and the carrier signal $u_H$. Intersections 5 of the signals $u_{Sta}$ and $u_H$ define switching times for the switching element 3a. For each intersection 5 of the sinusoidal wave form modulation signal $u_{Sta}$ and the triangular wave form carrier signal $u_H$, the inverter output voltage $u_a$ changes in polarity. A degree of modulation $a_0$ (modulation index) and a fundamental oscillation frequency $f_1$ of the modulation signals $u_{Sta}$, $u_{Stb}$ and $u_{Stc}$ determine the amplitude ($a_0 \cdot U_d/2$) and the frequency $f_1$ of the fundamental oscillation $u_{GS}$ of the inverter output voltages $u_a$, $u_b$ and $u_c$. A cycle frequency F of the triangular carrier signal $u_H$ determines the inverter switching frequency F in accordance with the following formula:

$$F = F_0 + \Delta F \cdot \sin(2 \cdot \pi \cdot f_F \cdot t + \alpha_F)$$

In the formula, $F_0$ is the fundamental pulse frequency, $\Delta F$ is the frequency deviation of the pulse frequency modulation (PFM), $f_F$ is the pulse modulation frequency and $\phi_F$ is the phase position of the sinusoidally varied pulse frequency.

The FIG. 2b is a plot of the amplitude versus time for the sinusoidal pulse width modulated (PWM) signal $u_{Sta}$ of the fundamental oscillation frequency $f_1$ as defined by the following formula which also applies to the signals $u_{Stb}$ and $u_{Stc}$:

$$u_{Sta,b,c} = u_{St} \cdot \cos(2 \cdot \pi \cdot f_1 + \delta_0 D)$$

The FIG. 2c is a plot of amplitude versus time for the sinusoidal pulse frequency modulated (PFM) signal of the frequency $f_F$, which modulates the triangular carrier signal $u_H$. The object of the modulation of the carrier signal $u_H$ is to influence the frequency spectrum of the inverter output voltages $u_a$, $u_b$ and $u_c$ by a constant variation of the inverter switching frequency F so that a uniform frequency distribution arises. It is also possible to modulate the triangular carrier signal $u_H$ by other curve shapes, such as for example triangular, sawtooth and so forth. The FIG. 2d is a plot of amplitude versus time for another possible wave form for the inverter output voltage $u_a$. The rising and falling edges of voltage blocks 6 correspond with the switching intersections 5.

Figure 3:
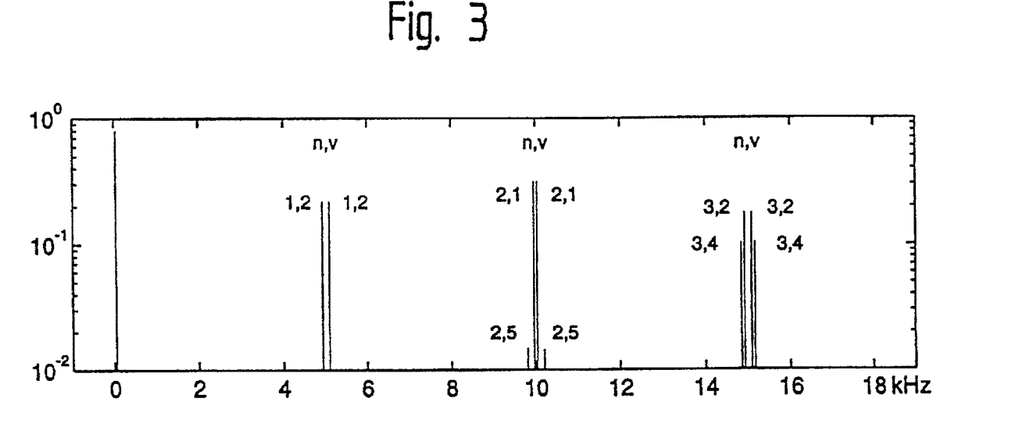
FIG. 3 is a plot of the frequency spectrum of a stator voltage of the subharmonic method with constant carrier frequency.

There is shown in the FIG. 3 a frequency spectrum plot of a stator voltage produced by the subharmonic method. The generated voltage $u_a$, by reason of the constant pulse frequency F of the carrier signal $u_H$, displays high amplitudes only for individual frequencies around the multiples of the pulse frequency F. These main groups of harmonics have the parameters "n" and "v", wherein "n" denotes the ordinate number of the fundamental pulse frequency $F_0$ and "v" the ordinate number of the pulse width modulation frequency $f_1$. These harmonics produce a sharp unpleasant noise from the electrical machine.

Figure 4:
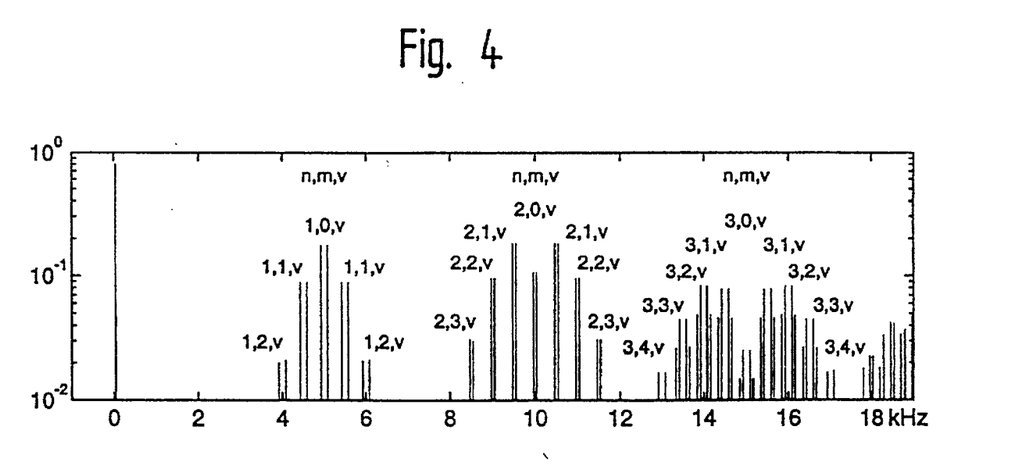
FIG. 4 is a plot of the fanning-out of the frequency spectrum of a stator voltage by the method according to the invention with pulse width and pulse frequency modulation.

There is shown in the FIG. 4 a frequency spectrum plot of a stator voltage with additional sinusoidal pulse frequency modulation (PFM) of the carrier signal $u_H$ according to the present invention. The constant variation of the frequency F of the triangular signal $u_H$ results in a uniform distribution of the harmonics over the entire frequency range. In that case, the main groups of the harmonics in the stator voltage produced by the subharmonic method (FIG. 3) are fanned out into subgroups with the parameters "n", "m" and "v", wherein "n" denotes the ordinate number of the fundamental pulse frequency $F_0$, "v" the ordinate number of the pulse width modulation frequency $f_1$ and "m" the ordinate number of the pulse frequency modulation frequency $f_F$. The spectrum can be fanned out widely by targeted setting of the parameters $\Delta F$ and $f_F$ as explained as explained below for the computation of the inverter output voltages $u_a$, $u_b$ and $u_c$.

Figure 5:
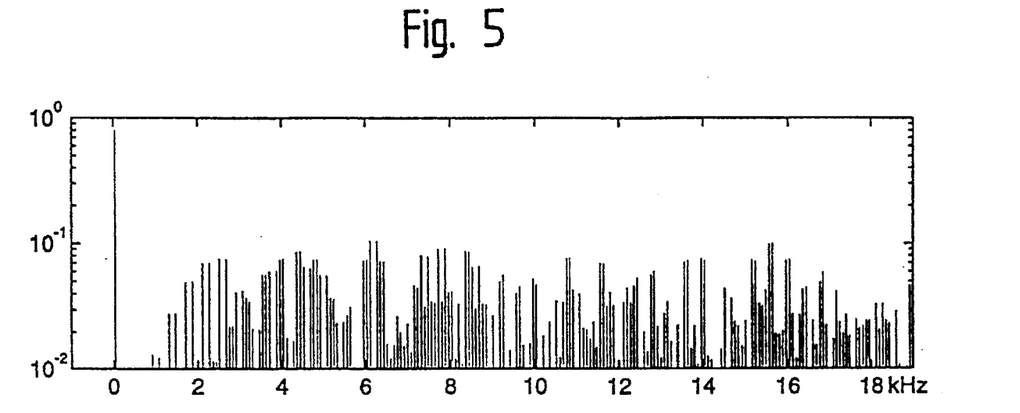
FIG. 5 is a plot of a widely fanned-out frequency spectrum by the method according to the invention.

The FIG. 5 shows a widely fanned-out frequency spectrum plot of a stator voltage generated by the method according to the present invention. The inverter output voltages $u_a$, $u_b$ and $u_c$ and the harmonic components $U_{nmv}$ are computed utilizing the following formula:

$$u_{a,b,c} = U_d/2 \cdot a_0 \cdot \cos(2 \cdot \pi \cdot f_1 \cdot t + \delta_0 + D) + \sum_{n=1}^{\infty} \sum_{m=0}^{\infty} \sum_{v=0}^{\infty} U_{nmv}$$

Formula 1

-continued $$\begin{bmatrix} \cos[2 \cdot \pi \cdot (n \cdot F_0 + m \cdot f_F + v \cdot f_1) \cdot t + (n \cdot \gamma_0 - m \cdot \pi/2 + m \cdot \phi_F + v \cdot \delta_0) + v \cdot D] + \\ + \cos[2 \cdot \pi \cdot (n \cdot F_0 + m \cdot f_F - v \cdot f_1) \cdot t + (n \cdot \gamma_0 - m \cdot \pi/2 + m \cdot \phi_F - v \cdot \delta_0) - v \cdot D] + \\ + \cos[2 \cdot \pi \cdot (n \cdot F_0 - m \cdot f_F + v \cdot f_1) \cdot t + (n \cdot \gamma_0 - m \cdot \pi/2 - m \cdot \phi_F + v \cdot \delta_0) + v \cdot D] + \\ + \cos[2 \cdot \pi \cdot (n \cdot F_0 - m \cdot f_F - v \cdot f_1) \cdot t + (n \cdot \gamma_0 - m \cdot \pi/2 - m \cdot \phi_F - v \cdot \delta_0) - v \cdot D] \end{bmatrix}$$

wherein the harmonic components are:

$$U_{nmv} = \sin[(n+v)\pi/2] \cdot 1/\pi \cdot U_d/2 \cdot 1/n \cdot \left[2 - \binom{0}{m}\right] \cdot \left[2 - \binom{0}{v}\right] \cdot J_m(n \cdot \Delta F/f_F) \cdot J_v(n \cdot \pi/2 \cdot a_0)$$

+1 for $n + v = 1, 5, 9, \ldots$     2 for $m > 0$   2 for $v > 0$
−1 for $n + v = 3, 7, 11, \ldots$   1 for $m = 0$   1 for $v = 0$
 0 for $n + v = 0, 2, 4, 6, \ldots$ the symbols $\binom{0}{m}, \binom{0}{v}$ signifying Binomial coefficients.

The symbols used in the Formula 1 signify:

$U_d$: Input direct voltage
$a_0$: Modulation index (0..1)
$f_1$: Fundamental oscillation frequency, pulse width modulation frequency
$U_{nmv}$: Voltage amplitude of the harmonic
n: Ordinate number of the fundamental pulse frequency $F_o$
v: Ordinate number of the pulse width modulation frequency $f_1$
m: Ordinate number of the pulse frequency modulation frequency $f_F$
$f_F$: Pulse frequency modulation frequency
$\Delta F$: Frequency deviation of the pulse frequency modulation
F: Pulse frequency
$F_0$: Fundamental pulse frequency
$J_m$, $J_v$: Bessel functions
D: Phase displacement 0° (a), −120° (b), +120° (c)
$\delta_0$: Phase position of the modulation voltage $u_{St}$ and the fundamental oscillation of the inverter output voltage $u_{a,b,c}$
$\gamma_0$: Phase position of the carrier signal $u_H$
$\phi_F$: Phase position of the pulse frequency modulation function F Due to the independence of the fundamental oscillation $$u_{GS} = (U_d/2) \cdot a_0 \cdot \cos(2 \cdot \pi \cdot f_1 \cdot t + \delta_0 + D)$$

of the pulse frequency modulation frequency $f_F$ and the frequency deviation $\Delta F$ for the pulse frequency modulation, the frequency spectrum changes as desired without influencing the fundamental oscillation $u_{GS}$.

The Bessel functions $$J_m(n \cdot \Delta F/f_F)$$

$$J_v(n \cdot \pi/2 \cdot a_0)$$

or the ratio $$\Delta F/f_F$$

determine the amplitudes $U_{nmv}$ of the harmonic components. The greater this ratio, the greater is the number of the subgroups with the ordinate number "m" and, consequently, this means a wider distribution of the frequency spectrum. From this there results the advantage that the frequency spectrum can be shaped as desired. In order to obtain as uniform a frequency distribution as possible, the modulation parameters $f_F$ and $\Delta F$ can be set so that the frequencies of the harmonics $U_{nmv}$ of neighboring main group "n", which overlap in the frequency spectrum, do not coincide. With the Bessel function for the computation of the harmonics $U_{nmv}$, not only is the frequency spectrum fanned out widely, but also harmonics of the subgroups "m", which would excite mechanical stator resonances, can be eliminated.

The pulse frequency modulation frequency $f_F$ directly determines the spacing $$\pm m \cdot f_F \pm v \cdot f_1$$

of the side band frequencies to the harmonics $n \cdot F_0$ of the fundamental pulse frequency $F_0$.

For the remainder, the phase position of the harmonic $U_{nmv}$ is in the multiplier $$[+\cos[2 \cdot \pi \cdot (n \cdot F_0 + m \cdot f_F + v \cdot f_1) \cdot t + \ldots]]$$

The noise, which is produced by stator vibrations due to the radial magnetic forces, has the same frequency distribution as the radial air gap force distribution "p". It is established on the basis of known computations that, for a constant fundamental oscillation amplitude of the magnetic air gap induction (assured by the usual manner of regulation of the asynchronous machine), the harmonic amplitudes $P_{nmv}$ of the radial air gap force distribution "p" are directly proportional to the harmonic amplitudes $U_{nmv}$ according to the formula set forth above.

$$P_{nmv} \sim U_{nmv}$$

This means basically that a noise reduction occurs through a reduction in the harmonic amplitudes. Due to the fanning-out of the frequency spectrum, the harmonic amplitudes of the inverter output voltages are reduced on the one hand and, on the other hand, a sound pattern arises, which no longer displays any conspicuous individual frequencies, but is perceived as even noise. In that case, not only a reduction in the noise level in terms of value is to be noted, but also a more pleasant noise arises due to the appearance of many frequencies distributed over the entire spectrum.

Figure 6:
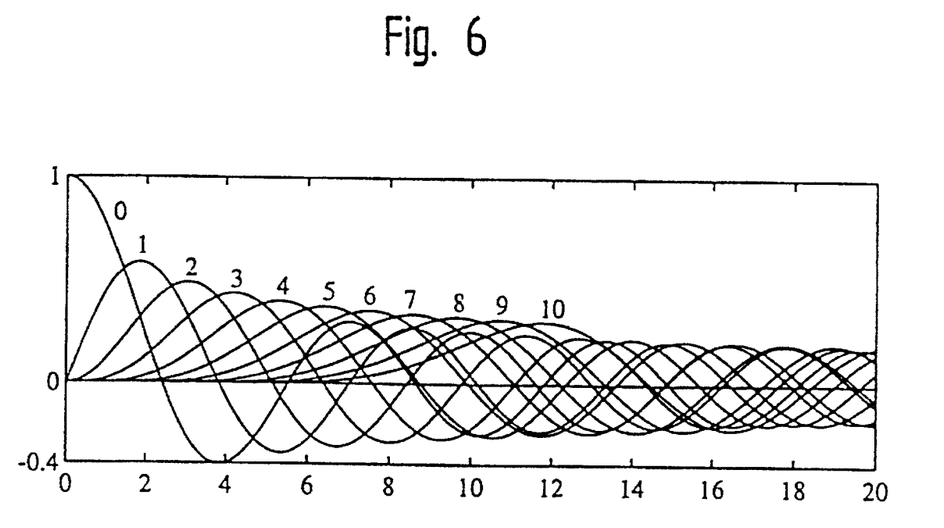
FIG. 6 is a plot of the Bessel functions.

There is shown in the FIG. 6 shows a plot of the Bessel functions used for the optimization of the modulation method and for the elimination of the frequency bands.

Figure 7:
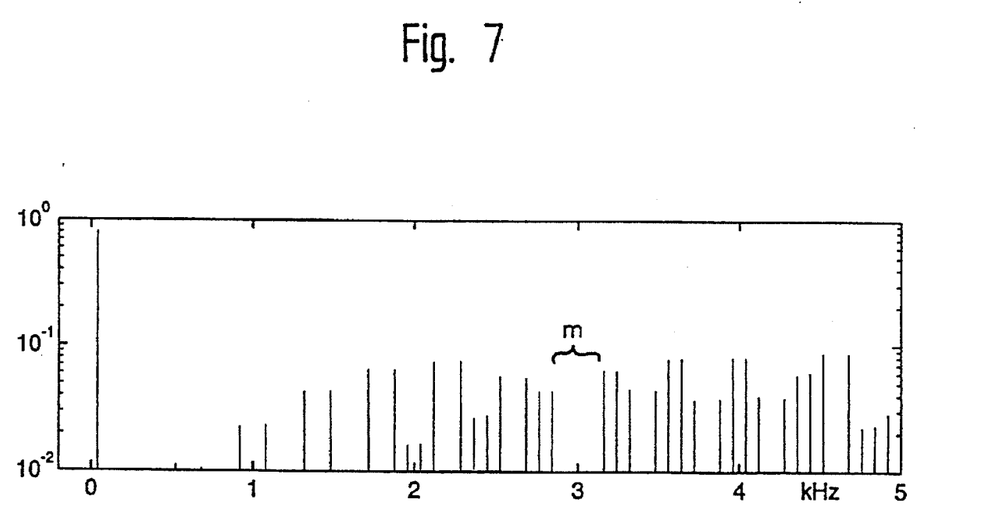
FIG. 7 is a plot of a frequency spectrum with eliminated frequency band.

FIG. 7 is a frequency spectrum plot using the method according to the present invention with an eliminated frequency band. The elimination is based upon the use of Bessel functions. The frequencies to be eliminated can be determined by the ratio $\Delta F/f_F$. The amplitudes of the harmonics $U_{nmv}$ at the frequencies $$n \cdot F_0 \pm m \cdot f_F \pm v \cdot f_1$$

are proportional to the Bessel function $$J_m(n \cdot \Delta F/f_F)$$

Through appropriate setting of the parameters $\Delta F$ and $f_F$, the Bessel function tier certain carrier multiples "n" and subgroups "m" can become zero. The procedure is explained in the following: The fundamental pulse frequency $F_0$ of the triangular carrier signal $u_H$ is fixed. The position of the subgroups "m" is known through the choice of the pulse frequency modulation frequency $f_F$. The disturbing frequency range can be selected by reference to the ascertained mechanical stator resonant frequency. The ordinate number of the Bessel function can be determined through the ordinate number "m" of the subgroup. In order to eliminate the frequency band or the subgroup "m", the Bessel function according to FIG. 6 of the previously ascertained ordinate number is to be set to zero. The argument at the zero place is equal to the ratio $$(n \cdot \Delta F)/f_F$$

The pulse frequency modulation frequency $f_F$ was fixed previously. Thus, the frequency deviation $\Delta F$ of the pulse frequency modulation can be determined so that the desired subgroup "m" is not produced in the frequency spectrum. The elimination of the selected subgroup "m" is independent of the modulation index $a_0$ and the fundamental oscillation frequency $f_1$ and is therefore also independent of the operating point of the machine.

A second embodiment of the present invention relates to a method utilizing a space vector modulation in place of the carrier modulation.

The derivation of the frequency spectrum of the inverter output voltages $u_a$, $u_b$ and $u_c$ of the pulse width modulation method with variable pulse frequency was performed on the basis of the carrier modulation, since this, by contrast to the space vector modulation, better represents the time dependence of the pulse width modulation and the pulse frequency modulation. Of course, the practical implementation can take place in both ways (carrier or space vector modulation) with the same result.

For explanation of the space vector modulation, the control voltages $U_{Sta}$, $U_{Stb}$ and $U_{Stc}$, as well as the inverter output voltages $u_a$, $u_b$ and $u_c$, are transformed by the following rule into the space vector region:

$$\bar{x} = \tfrac{2}{3} \cdot [x_a + x_b \cdot e^{+j120°} + x_c \cdot e^{-j120°}]$$

Figure 8A:
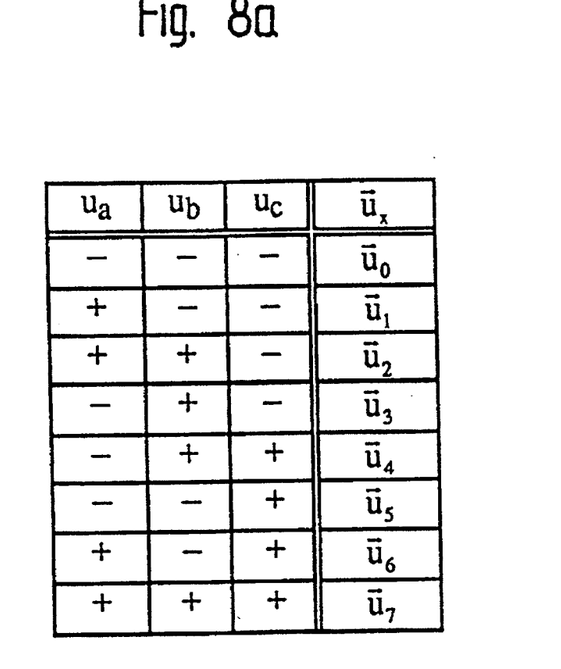
FIG. 8a is a table of the possible combinations of the inverter output voltages according to a second embodiment of the invention.

For the control voltages $u_{Sta,b,c} = U_d/2 \cdot a_0 \cdot \cos(2 \cdot \pi \cdot f_1 \cdot t + \delta_0 + D)$ the rotary vector results according to the above rule:

$$\bar{u}_{St} = U_d/2 \cdot a_0 \cdot e^{j\delta(t)}$$

with $\delta(t) = 2 \cdot \pi f_1 \cdot t + \delta_0$. Since the inverter output voltages $u_a$, $u_b$ and $u_c$ can assume only the values $\pm U_d/2$ due to the switching elements 3, the replication of the desired continuously revolving rotary vector succeeds only in an incomplete manner. The table shown in the FIG. 8a displays the only eight possible combinations of the three instantaneous inverter output voltages, from which only six possible discrete rotary vector positions ($\bar{u}_1, \bar{u}_2, \bar{u}_3, \bar{u}_4, \bar{u}_5, \bar{u}_6$), as well as two zero positions ($\bar{u}_0, \bar{u}_7$) can emanate.

Figure 8B:
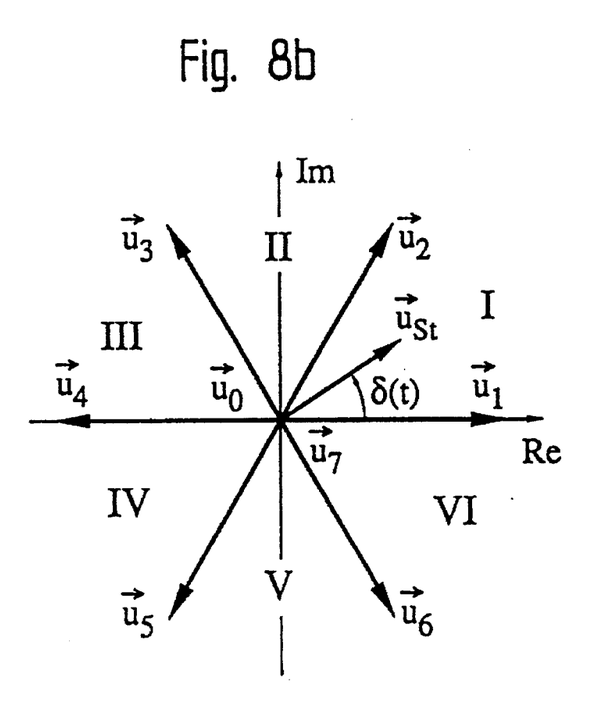
FIG. 8b is a rotary vector diagram of the space vector modulation method.

The "rotary vector star" shown in the FIG. 8b is subdivided into the inscribed sectors I to VI. In the case of the subharmonic method with constant pulse frequency $F = F_0$, the discrete rotary vectors are changed according to a certain sequence six times for each pulse period $T = 1/F_0$. This discrete rotary vector sequence is always the same within one sector and is repeated after run-down of the cycle period T.

The time duration $t_x$ ($t_x = t_1, t_2, \ldots, t_6$) during which a discrete rotary vector $\bar{u}_x$ has validity within one sequence, depends on the modulation index $a_0$ and the angle $\delta(t)$.

The number (I, II, ..., VI) of the sector is determined by the location of the rotary vector. The discrete rotary vector sequences for the sectors L to VI are defined as following:

| Sector I   | $\bar{u}_1$ | $\bar{u}_0$ | $\bar{u}_1$ | $\bar{u}_2$ | $\bar{u}_7$ | $\bar{u}_2$ |
|------------|-------------|-------------|-------------|-------------|-------------|-------------|
| Sector II  | $\bar{u}_3$ | $\bar{u}_0$ | $\bar{u}_3$ | $\bar{u}_2$ | $\bar{u}_7$ | $\bar{u}_2$ |
| Sector III | $\bar{u}_3$ | $\bar{u}_0$ | $\bar{u}_3$ | $\bar{u}_4$ | $\bar{u}_7$ | $\bar{u}_4$ |
| Sector IV  | $\bar{u}_5$ | $\bar{u}_0$ | $\bar{u}_5$ | $\bar{u}_4$ | $\bar{u}_7$ | $\bar{u}_4$ |
| Sector V   | $\bar{u}_5$ | $\bar{u}_0$ | $\bar{u}_5$ | $\bar{u}_6$ | $\bar{u}_7$ | $\bar{u}_6$ |
| Sector VI  | $\bar{u}_1$ | $\bar{u}_0$ | $\bar{u}_1$ | $\bar{u}_6$ | $\bar{u}_7$ | $\bar{u}_6$ |

Sequence of the time spans: $t_1, t_2, t_3, t_4, t_5, t_6$ wherein:

$$t_1 + t_2 + t_3 + t_4 + t_5 + t_6 = T = 1/F_0$$

The discrete rotary vector sequences remain the same for the method according to the embodiment of the invention with variable pulse frequency F. It is changed only in that the pulse period $T = 1/F$ of a rotary vector sequence is varied. The individual time portion $t_1, t_2, \ldots, t_6$ within one sequence t thus becomes additionally dependent on the function:

$$F = F_0 + \Delta F \cdot \sin(2 \cdot \pi \cdot f_F \cdot t + \phi_F)$$

Figure 9:
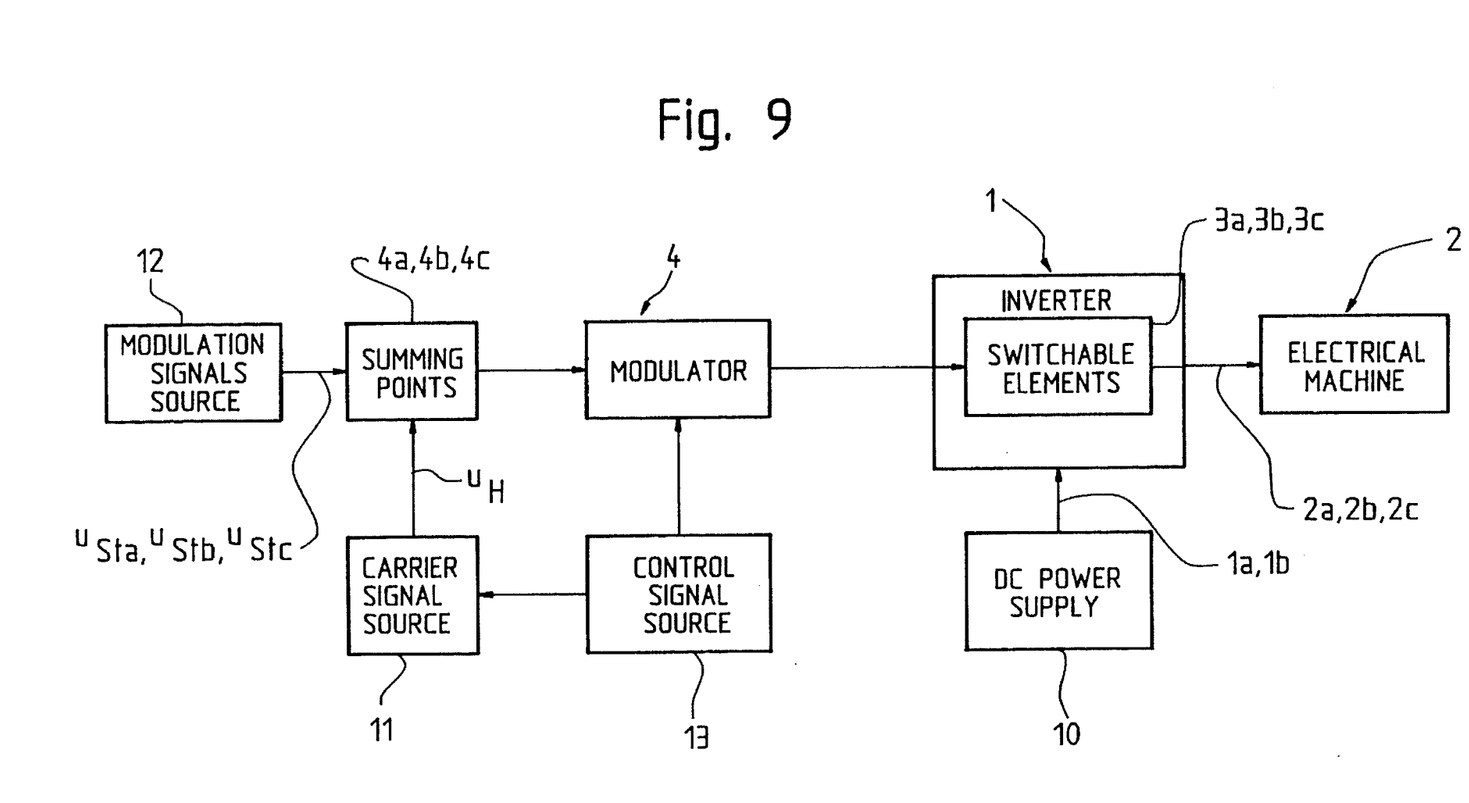
FIG. 9 is a block schematic diagram of an electrical machine system including the inverter shown in the FIG. 1.

FIG. 9 is a block schematic diagram of an electrical machine system including the inverter 1 shown in the FIG. 1. The inverter 1 has the inputs 1a, 1b connected to a direct current power source 10 to receive direct current power, the output for connection to the electrical machine 2 and the switchable means 3a, 3b, 3c. The switchable means 3a, 3b, 3c is responsive to a plurality of switching pulses for generating output voltages from the direct current power at the output to power the electrical machine 2 connected to the inverter output. A carrier signal source 11 having a frequency F is connected to the modulator 4 at the summing points 4a, 4b, 4c. Also connected to the modulator 4 at the summing points 4a, 4b, 4c is a modulation signals source 12 having a frequency $f_1$. The carrier signal from the source 11 pulse width modulates the modulation signals from the source 12 to generate switching signals from the modulator 4 to control the switchable elements 3a, 3b, 3c in the inverter 1. A control signal source 13 is connected to the carrier signal source 11 for generating a control signal which pulse frequency modulates the carrier signal. Alternatively, the control signal source 13 can connected to the modulator 4 for generating a control signal which space vector modulates the switching signals. Thus, the control signal reduces harmonic frequency components in and fans out a frequency spectrum of the output voltages from the inverter 1 by one of pulse frequency modulation of said carrier signal and space vector modulation of said modulation signals.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for the low-noise operation of an electrical machine connected to receive electrical power from a pulse inverter comprising:

an inverter having an input for connection to a direct current power source to receive direct current power, an output for connection to an electrical machine and switchable means, said switchable means being responsive to a plurality of switching pulses for generating output voltages from the direct current power at said output to power an electrical machine connected to said output;

a source of a carrier signal having a frequency F;

a source of modulation signals having a frequency $f_1$;

a source of a control signal; and a modulator having a plurality of inputs each associated with one of said switchable means, a connection to said control signal source and a plurality of outputs each connected to an associated one of said switchable means, each said input being connected to said carrier signal source and said modulation signals source, said modulator being responsive to said modulation signals and said carrier signal for generating said switching pulses whereby said control signal reduces harmonic frequency components in and fans out a frequency spectrum of said output voltages by one of pulse frequency modulation of said carrier signal and space vector modulation of said modulation signals.

2. The apparatus according to claim 1 wherein each input of said plurality of inputs is a summing point having one input for receiving one of said modulation signals from said modulation signal source and another input for receiving said carrier signal from said carrier signal source, said modulator being responsive to said carrier signal for modulating said modulation signals by pulse frequency modulation for generating said switching pulses.

3. The apparatus according to claim 1 wherein said control signal varies said modulation signals in a rotary vector sequence of space modulation for generating said switching signals.

4. The apparatus according to claim 1 wherein said control signal pulse frequency modulates said carrier signal and is varied sinusoidally.

5. The apparatus according to claim 1 wherein said control signal has frequency deviation of pulse frequency modulation ($\Delta F$) and a pulse modulation frequency ($f_F$), harmonic components of said output voltages depend upon a Bessel function having a ratio ($n \cdot \Delta F/f_F$) of modulation parameters as an argument and a fanning-out of a frequency spectrum of stator voltages of the electrical machine into subgroups (m) is increased and amplitudes of said harmonic components ($U_{nmv}$) are reduced by an increase in said ratio ($n \cdot \Delta F/f_F$).

6. The apparatus according to claim 5 wherein said subgroups (m) in said frequency spectrum are eliminated by setting said ratio ($n \cdot \Delta F/f_F$) of said modulation parameters so that a one of said Bessel functions ($J_m(n \cdot \Delta F/f_F)$) belonging to said subgroup (m) becomes zero.

7. An apparatus for the low-noise operation of an electrical machine connected to receive electrical power from a pulse inverter comprising:

an inverter having an input for connection to a direct current power source to receive direct current power and three switchable means each having an output for connection to an electrical machine, said switchable means being responsive to a plurality of switching pulses for generating output voltages from the direct current power at said outputs to power an electrical machine connected to said outputs:

a source of a carrier signal having a frequency F;

a source of three modulation signals having a frequency $f_1$;

a source of a control signal; and a modulator having three inputs each associated with one of said switchable means and three outputs each connected to an associated one of said switchable means, each said modulator input being connected to said modulation signal source for receiving an associated one of said modulation signals and being connected to said carrier signal source for receiving said carrier signal, said modulator being responsive to said carrier signal for pulse width modulating said modulation signals for generating said switching pulses, said modulator being connected to said control signal source whereby said control signal reduces harmonic frequency components in and fans out a frequency spectrum of said output voltages by one of pulse frequency modulation of said carrier signal and space vector modulation of said modulation signals.

8. A method for the low-noise operation of an electrical machine connected to receive electrical power from a pulse inverter comprising the steps of:

a. generating a plurality of pulse width modulated switching pulses by summing modulation signals and a carrier signal and applying the switching pulses to an inverter to control a pulse pattern of output voltages generated by the inverter connected to an electrical machine; and b. modulating one of the carrier signal and the modulation signals by varying a pulse frequency (F) of the carrier signal and an inverse cycle period of a rotary vector sequence of the modulation signals whereby frequency components which produce disturbing harmonic components in the output voltages are reduced and a frequency spectrum of the output voltages is fanned out.

9. The method according to claim 8 wherein the pulse frequency (F) of the carrier signal and the inverse cycle period of the rotary vector sequence of the modulation signals are varied sinusoidally.

10. The method according to claim 8 wherein the step b. includes identifying harmonic components ($U_{nmv}$) of the output voltages utilizing a frequency deviation ($\Delta F$) of the pulse frequency modulation of the carrier signal and a pulse modulation frequency ($f_F$) of the pulse frequency modulation.

11. The method according to claim 10 wherein the harmonic components $U_{nmv}$ of the output voltages depend upon a Bessel function having a ratio ($n \cdot \Delta F/f_F$) of modulation parameters as an argument.

12. The method according to claim 11 wherein fanning-out of a frequency spectrum of stator voltages of the electrical machine into subgroups (m) is increased and amplitudes of the harmonic components ($U_{nmv}$) are reduced by an increase in the ratio ($n \cdot \Delta F/f_F$).

13. The method according to claim 12 wherein the subgroups (m) in the frequency spectrum are eliminated by setting the ratio ($n \cdot \Delta F/f_F$) of the modulation parameters so that a one of the Bessel functions ($J_m(n \cdot \Delta F/f_F)$) belonging to the subgroup (m) becomes zero.

\* \* \* \* \*